US011182111B2

(12) United States Patent
Hiruma

(10) Patent No.: US 11,182,111 B2
(45) Date of Patent: Nov. 23, 2021

(54) JOB PROCESSING APPARATUS THAT DISPLAYS JOB HISTORY SCREEN, CONTROL METHOD FOR JOB PROCESSING APPARATUS, AND NON-TRANSITORY COMPUTER-READABLE STORAGE MEDIUM

(71) Applicant: CANON KABUSHIKI KAISHA, Tokyo (JP)

(72) Inventor: Junichi Hiruma, Hidaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/751,916

(22) Filed: Jan. 24, 2020

(65) Prior Publication Data
US 2020/0159470 A1    May 21, 2020

Related U.S. Application Data

(60) Division of application No. 15/617,016, filed on Jun. 8, 2017, now abandoned, which is a continuation of
(Continued)

(30) Foreign Application Priority Data

Nov. 14, 2014 (JP) ................................. 2014-231968

(51) Int. Cl.
G06F 3/12 (2006.01)
H04N 1/00 (2006.01)
H04N 1/32 (2006.01)

(52) U.S. Cl.
CPC .......... *G06F 3/1204* (2013.01); *G06F 3/1273* (2013.01); *G06F 3/1285* (2013.01);
(Continued)

(58) Field of Classification Search
None
See application file for complete search history.

(56) References Cited

U.S. PATENT DOCUMENTS 6,041,165 A    3/2000 Morikawa
7,075,670 B1   7/2006 Koga
(Continued)

FOREIGN PATENT DOCUMENTS

CN    1462935 A    12/2003
CN    102722345 A  10/2012
(Continued)

OTHER PUBLICATIONS

Office Action issued in U.S. Appl. No. 14/931,008 dated Jul. 5, 2016.
(Continued)

*Primary Examiner* — Thomas D Lee
(74) *Attorney, Agent, or Firm* — Rossi, Kimms & McDowell LLP

(57) ABSTRACT

Job information being information concerning a processed job is managed together with an attribute that indicates whether the job information is printed or unprinted. Out of the managed pieces of job information of jobs, job information having an attribute indicating unprinted state is printed and the attribute of the printed job information is updated so as to indicate printed state. Out of the managed pieces of job information of jobs, when an instruction to print job information of a job corresponding to a logged-in user is received, the job information corresponding to the user is printed and the attribute of the printed job information is not updated.

10 Claims, 10 Drawing Sheets

Related U.S. Application Data application No. 14/931,008, filed on Nov. 3, 2015, now Pat. No. 9,703,507.

(52) U.S. Cl.
CPC ....... *H04N 1/0032* (2013.01); *H04N 1/32106* (2013.01); *H04N 2201/0094* (2013.01)

(56) References Cited

U.S. PATENT DOCUMENTS

| | | |
|---|---|---|
| 8,351,068 B2 | 1/2013 | Koyano |
| 8,837,005 B2 | 9/2014 | Morita |
| 9,299,018 B2 | 3/2016 | Maki |
| 2004/0036908 A1 | 2/2004 | Yagita |
| 2006/0023240 A1 | 2/2006 | Natori |
| 2006/0262340 A1 | 11/2006 | Lee |
| 2008/0080014 A1 | 4/2008 | Shimamoto |
| 2008/0174818 A1 | 7/2008 | Kanamoto |
| 2012/0268784 A1 | 10/2012 | Mori |
| 2013/0057884 A1 | 3/2013 | Sasaki |
| 2014/0068502 A1* | 3/2014 | Tomiyasu ............. G06F 3/0485 715/784 |
| 2014/0082137 A1* | 3/2014 | Matoba .................. H04L 67/02 709/217 |
| 2014/0211240 A1* | 7/2014 | Maki ..................... G06F 3/1222 358/1.14 |

FOREIGN PATENT DOCUMENTS

| | | |
|---|---|---|
| JP | H11112726 A | 4/1999 |
| JP | 2003078678 A | 3/2003 |
| JP | 2004094359 A | 3/2004 |
| JP | 2005184414 A | 7/2005 |
| JP | 2006173798 A | 6/2006 |
| JP | 2007257627 A | 10/2007 |
| JP | 2008181239 A | 8/2008 |
| JP | 2010020223 A | 1/2010 |
| JP | 2010130509 A | 6/2010 |
| JP | 2011030085 A | 2/2011 |
| JP | 2013048353 A | 3/2013 |
| JP | 2013115519 A | 6/2013 |
| JP | 2013162481 A | 8/2013 |
| JP | 2014117884 A | 6/2014 |
| JP | 2014144619 A | 8/2014 |

OTHER PUBLICATIONS

Office Action issued in U.S. Appl. No. 14/931,008 dated Dec. 20, 2016.
Notice of Allowance issued in U.S. Appl. No. 14/931,008 dated Mar. 16, 2017.
Office Action issued in Chinese Appln. No. 201510725324.6 dated Mar. 7, 2018. English translation provided.
Office Action issued in Japanese Application No. 2014-231968 dated May 18, 2018.
Office Action issued in U.S. Appl. No. 15/617,016 dated Apr. 19, 2018.
Office Action issued in U.S. Appl. No. 15/617,016 dated Oct. 26, 2018.
Notice of Allowance issued in U.S. Appl. No. 15/617,016 dated Feb. 14, 2019.
Office Action issued in U.S. Appl. No. 15/617,016 dated Jun. 12, 2019.
Office Action issued in Japanese Application No. 2019-007921 dated Apr. 6, 2020.
Office Action issued in Japanese Appln. No. 2020-198719 dated Sep. 6, 2021.

* cited by examiner

FIG. 2

| | | | | | | |
|---|---|---|---|---|---|---|
| REPORT COMPLETION FLAG | ACCESSION NUMBER | TIME | USER NAME | TYPE | DESTINATION | RESULT |
| | 0001 | 09:22 | ippan | EMAIL | test1@ml | OK |
| | 0002 | 09:27 | ippan | SMB | ¥¥test2¥dir | OK |
| | 0003 | 10:43 | ippan | SMB | ¥¥test3¥dir | NG |
| | 0004 | 11:12 | root | EMAIL | test4@ml | OK |
| | 0005 | 11:30 | root | EMAIL | test5@ml | OK |
| | 0006 | 11:40 | root | EMAIL | test6@ml | OK |
| | 0007 | 11:50 | ippan | SMB | ¥¥test7¥dir | OK |

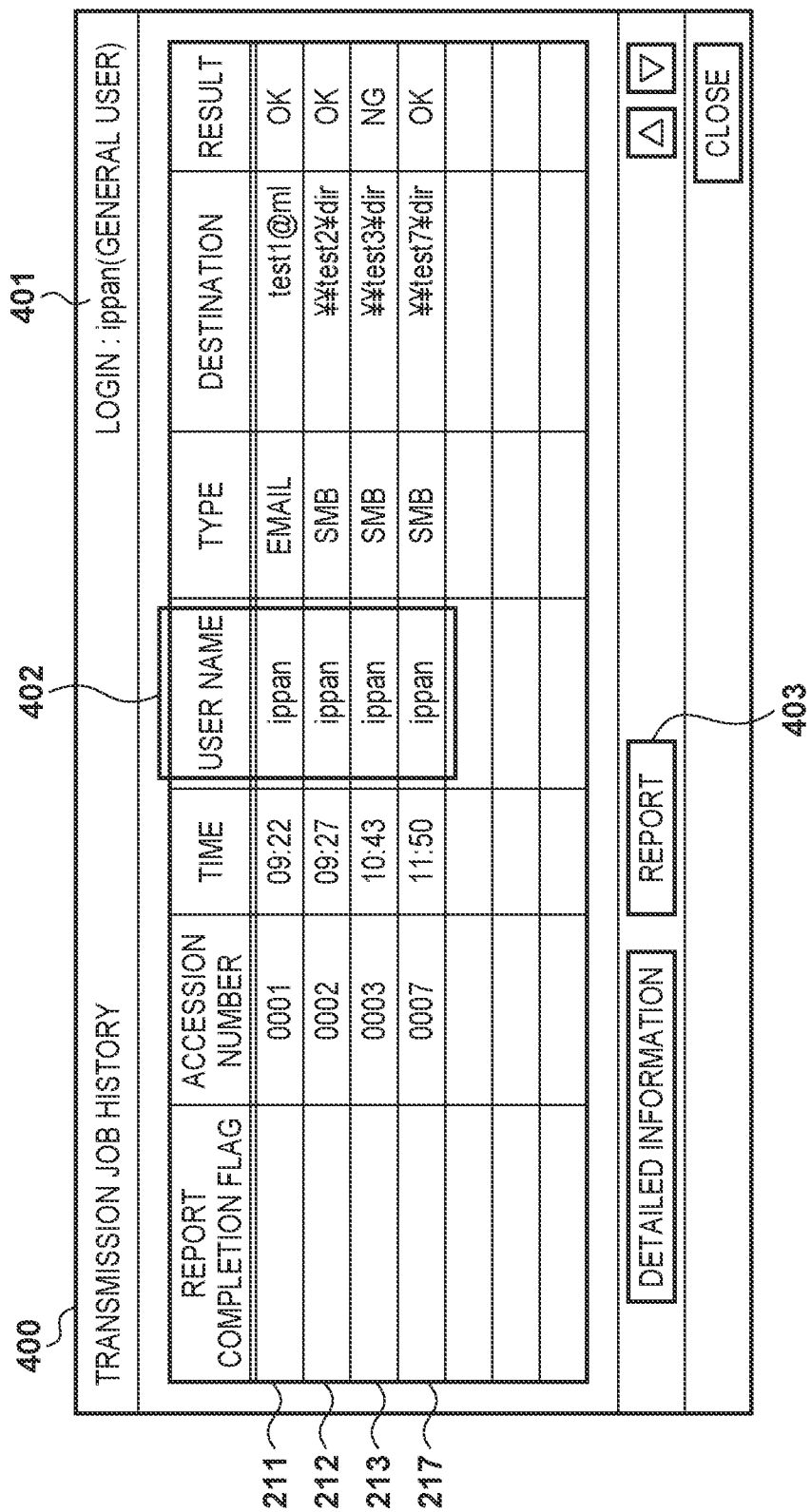

F I G. 4B

COMMUNICATION MANAGEMENT REPORT

| REPORT COMPLETION FLAG | ACCESSION NUMBER | TIME | USER NAME | TYPE | DESTINATION | RESULT |
|---|---|---|---|---|---|---|
|  | 0001 | 09:22 | ippan | EMAIL | test1@ml | OK |
|  | 0002 | 09:27 | ippan | SMB | ¥¥test2¥dir | OK |
|  | 0003 | 10:43 | ippan | SMB | ¥¥test3¥dir | NG |
|  | 0007 | 11:50 | ippan | SMB | ¥¥test7¥dir | OK |

FIG. 4C

| REPORT COMPLETION FLAG | ACCESSION NUMBER | TIME | USER NAME | TYPE | DESTINATION | RESULT |
|---|---|---|---|---|---|---|
| ✓ | 0001 | 09:22 | ippan | EMAIL | test1@ml | OK |
| ✓ | 0002 | 09:27 | ippan | SMB | \\test2\dir | OK |
| ✓ | 0003 | 10:43 | ippan | SMB | \\test3\dir | NG |
|  | 0004 | 11:12 | root | EMAIL | test4@ml | OK |
|  | 0005 | 11:30 | root | EMAIL | test5@ml | OK |
|  | 0006 | 11:40 | root | EMAIL | test6@ml | OK |
| ✓ | 0007 | 11:50 | ippan | SMB | \\test7\dir | OK |

FIG. 5A

TRANSMISSION JOB HISTORY — 500

LOGIN : root(ADMINISTRATOR) — 501

FILTER — 502

| REPORT COMPLETION FLAG | ACCESSION NUMBER | TIME | USER NAME | TYPE | DESTINATION | RESULT |
|---|---|---|---|---|---|---|
|  | 0001 | 09:22 | ippan | EMAIL | test1@ml | OK |
|  | 0002 | 09:27 | ippan | SMB | ¥¥test2¥dir | OK |
|  | 0003 | 10:43 | ippan | SMB | ¥¥test3¥dir | NG |
|  | 0004 | 11:12 | root | EMAIL | test4@ml | OK |
|  | 0005 | 11:30 | root | EMAIL | test5@ml | OK |
|  | 0006 | 11:40 | root | EMAIL | test6@ml | OK |
|  | 0007 | 11:50 | ippan | SMB | ¥¥test7¥dir | OK |

211, 212, 213, 214, 215, 216, 217

505

DETAILED INFORMATION | REPORT — 503

△ ▽  CLOSE

FIG. 5B

| REPORT COMPLETION FLAG | ACCESSION NUMBER | TIME | USER NAME | TYPE | DESTINATION | RESULT |
|---|---|---|---|---|---|---|
| | 0001 | 09:22 | ippan | EMAIL | test1@ml | OK |
| | 0002 | 09:27 | ippan | SMB | ¥¥test2¥dir | OK |
| | 0003 | 10:43 | ippan | SMB | ¥¥test3¥dir | NG |
| ✓ | 0004 | 11:12 | root | EMAIL | test4@ml | OK |
| ✓ | 0005 | 11:30 | root | EMAIL | test5@ml | OK |
| ✓ | 0006 | 11:40 | root | EMAIL | test6@ml | OK |
| | 0007 | 11:50 | ippan | SMB | ¥¥test7¥dir | OK |

JOB PROCESSING APPARATUS THAT DISPLAYS JOB HISTORY SCREEN, CONTROL METHOD FOR JOB PROCESSING APPARATUS, AND NON-TRANSITORY COMPUTER-READABLE STORAGE MEDIUM

BACKGROUND OF THE INVENTION

Field of the Invention

The present invention relates to a management technique for job information for a processed job.

Description of the Related Art

Conventionally, an MFP (Multi Function Peripheral) having a copy service that incorporates a scanner function and a printer function, a transmission/reception service for email or FAX, and a network print service is known. Such an MFP is provided with a report function (communication management report function) in which the results of implemented transmission/reception and printing are saved as job histories in the device and printed on paper. Particularly, a printout of the report of the transmission/reception service job histories using the communication management report function is called a communication management report. Confidential information such as the job execution date/time, transmission/reception result, and address of the transmission destination is printed on the communication management report. Generally, the communication management report can be printed by an "automatic communication management report function" as disclosed in Japanese Patent Laid-Open Nos. 2010-130509 and 2003-78678.

The "automatic communication management report function" is a function in which a communication management report is automatically discharged to a tray when job histories not yet printed as a report have accumulated to a certain count. For example, the function can determine whether a predetermined number (for example, 100) of job histories unprinted as a communication management report has accumulated. If the job histories have accumulated, these unprinted job histories are printed as a report using the communication management report function and discharged to the tray.

The user of an MFP is largely classified into a general user and an administrator. The "automatic communication management report function" is a function intended for the administrator, and the administrator determines whether to make this function valid. The administrator checks if the communication management report has been discharged to the tray and manages the collected communication management report by filing the report. The communication management report is output chronologically and sequentially in segments in predetermined numbers. Accordingly, the administrator can organize the job histories to grasp and manage matters such as the occurrence of a communication error, disappearance of a job, and the like.

Further, as indicated in Japanese Patent Laid-Open No. 2010-20223, a "My job history function" is a function for picking up and displaying only job histories that match the user name of a login user. By not displaying the job histories of other login users, the job histories of the login user can be checked intensively. Additionally, since each job history includes confidential information, it is suitable as an operation to prevent the login user from grasping the job execution date/time, transmission/reception result, and transmission destination address of jobs executed by other login users.

The My job history function is a function intended for a general user. When the login user is the administrator, the job histories of all login users are displayed even if the My job history function is valid. This is because there are times when the administrator will conduct a check targeting all job histories for an omission in a job executed by a user, a job that ended with an "NG", when a job was completed, or the like.

The job history holds an attribute called "print completion flag". The print completion flag changes from an unprinted state to a printed state when a job history is printed by the communication management report function.

The "automatic communication management report function" is a function that automatically prints, by using the communication management report function, job histories not yet printed as a report when the job histories accumulate in a predetermined number. The determination whether the job histories have accumulated in a predetermined number is performed by determining whether a predetermined number of job histories having print completion flags indicating the "unprinted" state has accumulated. When the predetermined number of job histories with print completion flags indicating the "unprinted" state accumulates, only the job histories with the print completion flags indicating the "unprinted" state are printed.

A general user can display, in the case of the My job history function, only the job histories that match the user name of that general user and manually print a report using the communication management report function by pressing a print button. When the general user manually prints a report, the print completion flag for the job history changes to the "printed" state. Because of this, the job histories that have been printed as a report will not be handled by the "automatic communication management report function", and an omission will exist in the automatic communication management report.

The administrator cannot determine, even by obtaining the automatic communication management report with an omission, whether the omission occurred due to an abnormal situation such as a disappearance of a job or the omission was due to printing by a general user. If the administrator cannot manage all job histories, it can impede business operations. The "automatic communication management report function" needs to become capable of handling all job histories in the automatic communication management report.

SUMMARY OF THE INVENTION

The present invention has been made in consideration of the above problem and provides a technique to allow printed job information to be a print target for the "automatic communication management report function" even if a user has individually printed the job information of his/her job.

According to the first aspect of the present invention, there is provided a job processing apparatus comprising: a management unit configured to manage job information being information concerning a processed job together with an attribute that indicates whether the job information is printed or unprinted; and a control unit configured to cause a printing unit to print, out of pieces of job information of jobs managed by the management unit, job information having an attribute indicating unprinted state and to update the attribute of the printed job information so as to indicate printed state; wherein when an instruction to cause the printing unit to print job information, out of the pieces of job information of jobs managed by the management unit, of a job corresponding to a user logged in to the job processing apparatus is received, the control unit causes the printing unit to print the job information corresponding to the user and does not update the attribute of the printed job information.

According to the second aspect of the present invention, there is provided a control method for a job processing apparatus, comprising: managing job information being information concerning a processed job together with an attribute that indicates whether the job information is printed or unprinted; and controlling to cause a printing unit to print, out of the managed pieces of job information, job information having an attribute indicating unprinted state and update the attribute of the printed job information so as to indicate printed state; wherein in the controlling, when an instruction to cause the printing unit to print job information, out of the managed pieces of job information, of a job corresponding to a user logged in to the job processing apparatus is received, the printing unit is caused to print the job information corresponding to the user and the attribute of the printed job information is not updated.

According to the third aspect of the present invention, there is provided a non-transitory computer-readable storage medium storing a computer program for causing a computer of a job processing apparatus to function as: a management unit configured to manage job information being information concerning a processed job together with an attribute that indicates whether the job information is printed or unprinted; and a control unit configured to cause a printing unit to print, out of pieces of job information of jobs managed by the management unit, job information having an attribute indicating unprinted state and to update the attribute of the printed job information so as to indicate printed state; wherein when an instruction to cause the printing unit to print job information, out of the pieces of job information of jobs managed by the management unit, of a job corresponding to a user logged in to the job processing apparatus is received, the control unit causes the printing unit to print the job information corresponding to the user and does not update the attribute of the printed job information.

Further features of the present invention will become apparent from the following description of exemplary embodiments (with reference to the attached drawings).

BRIEF DESCRIPTION OF THE DRAWINGS

FIG. 2 is a view showing an example of an arrangement of a history table 200;

FIGS. 4A to 4C are views for explaining individual printing by a user who is a non-administrator;

FIGS. 5A and 5B are views for explaining individual printing by an administrator;

DESCRIPTION OF THE EMBODIMENTS

Figure 1:
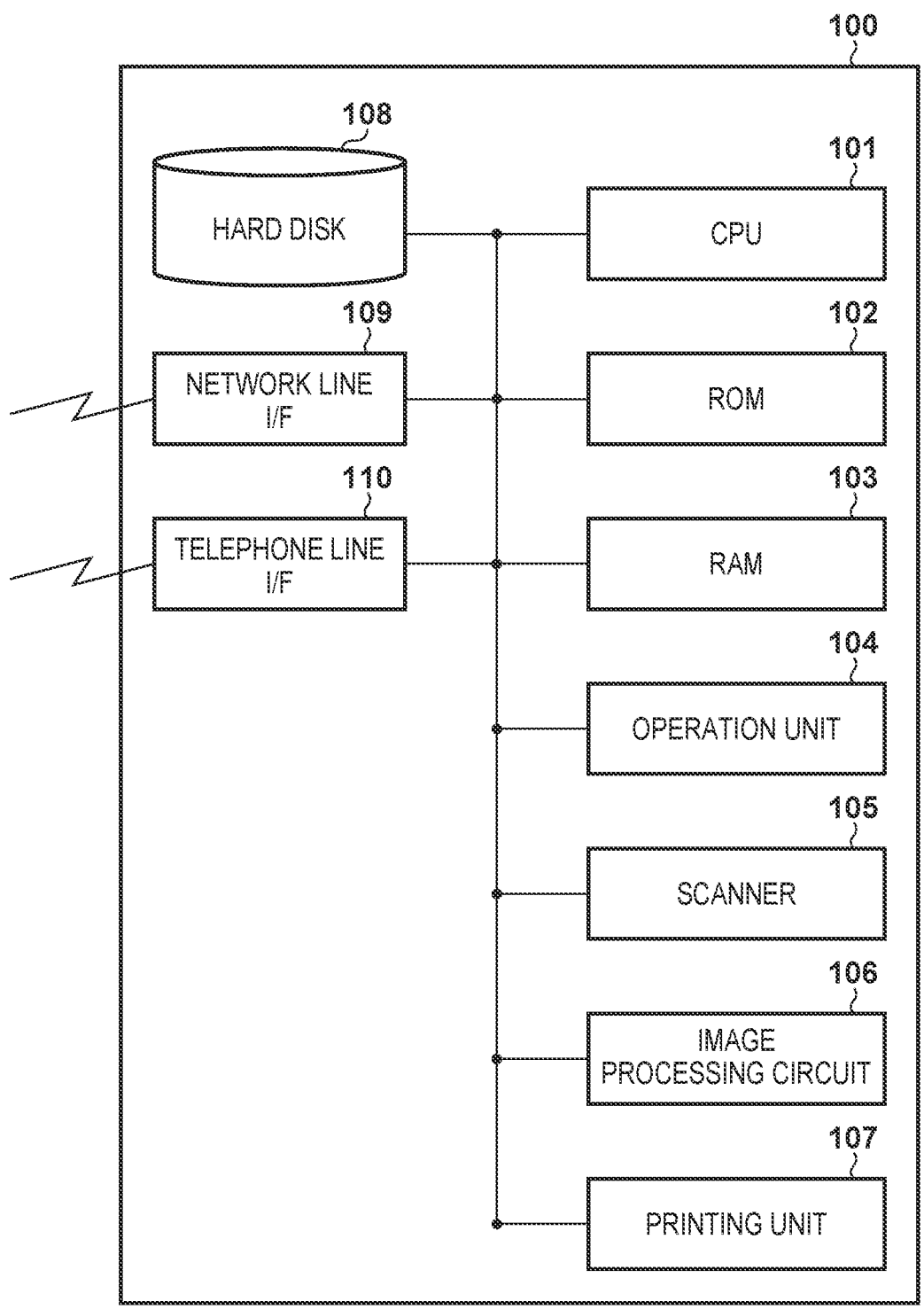
FIG. 1 is a block diagram showing an example of an arrangement of a job processing apparatus.

Embodiments of the present invention will be described below with reference to the accompanying drawings. Note that the embodiments to be described below are merely examples when the present invention is practiced concretely, and are practical embodiments of arrangements described in the appended claims.

First Embodiment

This embodiment will explain an example of a job processing apparatus comprising a management unit configured to manage job information being information concerning a processed job together with an attribute that indicates whether the job information is printed or unprinted, and a control unit configured to cause a printing unit to print, out of the pieces of job information of jobs managed by the management unit, job information having an attribute indicating unprinted state and to update the attribute of the printed job information so as to indicate printed state, wherein when an instruction to cause the printing unit to print job information of a job, out of the pieces of job information of jobs managed by the management unit, corresponding to a user logged in to the job processing apparatus is received, the control unit causes the printing unit to print job information corresponding to the user and does not update the attribute of the job information that is printed. Therefore, as long as a job processing apparatus will result in such an arrangement, a job processing apparatus having any arrangement may be employed, and processes to be performed by the job processing apparatus will not be limited to those to be described below.

First, an example of an arrangement of a job processing apparatus according to the embodiment will be described with reference to the block diagram of FIG. 1. The following will explain a case where the job processing apparatus is an MFP (Multi-Function Peripheral).

By executing processing using computer programs and data stored in a ROM 102 or RAM 103, a CPU 101 performs control of the entire operation of a job processing apparatus 100 and executes or controls each process (to be described later) as processing to be performed by the job processing apparatus 100.

The ROM 102 stores computer programs and data concerning activation of the job processing apparatus 100 and computer programs and data concerning the basic operation of the job processing apparatus 100. Additionally, the ROM 102 stores computer programs and data concerning various kinds of GUIs (Graphical User Interfaces) and the like. The computer program or data stored in the ROM 102 is appropriately loaded to the RAM 103 according to the control by the CPU 101, thereby making the program or data become a processing target of the CPU 101.

The RAM 103 includes an area for storing the computer programs and data loaded from the ROM 102 or a hard disk 108 and data received from an external device via a network line I/F (interface) 109 or a telephone line I/F 110. Additionally, the RAM 103 has an area for storing an image read by a scanner 105 and a work area used when the CPU 101 executes various kinds of processes. In this manner, the RAM 103 can appropriately provide various kinds of areas.

An operation unit 104 is formed by a touch panel screen or hard keys such as a group of buttons. The operation unit 104 provides a display function for displaying various kinds of information and an user interface function which allows a user to operate and input various kinds of instructions.

The scanner 105 is, as is well-known, a device for reading information recorded on a recording medium such as paper as an image and outputting the read image. The image read by the scanner 105 is stored in the RAM 103 or the hard disk 108.

An image processing circuit 106 is formed by a mass image memory, an image rotating circuit, a resolution scaling circuit, encoding/decoding circuits of MH, MR, MMR, JBIG, JPEG, or the like and can execute various kinds of image processes such as shading, trimming, masking, or the like. The image processing circuit 106, for example, executes various kinds of image processes to an image read by the scanner 105.

The hard disk 108 is an example of a mass information storage device connected via an interface such as SCSI, IDE, or the like. An OS (Operating System) and data and computer programs to be executed by the CPU 101 as processes (to be described later) performed by the job processing apparatus 100 are saved in the hard disk 108. In addition, information handled as known information in the following description is stored in this hard disk 108. The computer program or data saved in the hard disk 108 is appropriately loaded to the RAM 103 according to the control by the CPU 101, thereby making the program or data become a processing target of the CPU 101.

Note that the computer programs and data described as stored in the ROM 102 and the computer programs and data described as stored in the hard disk 108 can be stored (saved) in either the ROM 102 or the hard disk 108 depending on their type (for example, whether it need not be rewritten).

A printing unit 107 is a device for printing, on a recording medium such as paper, images and characters based on printing data received from the outside via the network line I/F 109 or the telephone line I/F 110 and images read by the scanner 105.

The network line I/F 109 functions as an interface to connect the job processing apparatus 100 to a network such as a LAN or the Internet. The job processing apparatus 100 performs data communication with a device on the network via this network line I/F 109.

The telephone line I/F 110 functions as an interface to connect the job processing apparatus 100 to a telephone line. The job processing apparatus 100 performs, for example, facsimile communication with a device connected on the telephone line via this telephone line I/F 110.

Note that the above-described scanner 105 and image processing circuit 106 are connected by a high-speed video bus separate from a CPU bus from the CPU 101 and are configured to rapidly transfer an image.

Next, a history table for jobs managed in the hard disk 108 by the job processing apparatus 100 will be described with reference to FIG. 2. A history table 200, shown in FIG. 2, is a table for managing information (job information) concerning a job for every job processed by the job processing apparatus 100. Reference numeral 201 indicates a group of items (attributes) managed by the job information. The following description will be made assuming that all the jobs are email transmission jobs.

A piece of job information is registered in each row of the history table 200, and each piece of job information includes values corresponding to items (attributes) of a report completion flag, an accession number, time (job accession time), a user name, type (type of email), a destination, and result (transmission success/failure). The following will describe the representative items.

A field 203 is a field for registering a flag (report completion flag) representing printed job information/unprinted job information. For example, if the job information registered in a row 211 is to be managed as printed job information, a checkmark is registered in the field 203 of the row 211. If the job information registered in the row 211 is to be managed as unprinted job information, no checkmark is registered in the field 203 of the row 211. In FIG. 2, since no checkmarks are registered in any of the fields 203 of the rows 211 to 217, all the pieces of job information respectively registered in the rows 211 to 217 are managed as pieces of unprinted job information that have not been printed.

A field 204 is a field for registering the accession number of a job. Every time a job is received, the CPU 101 assigns a unique accession number to the job and registers the accession number in the field 204 of the row for registering the job information of the job. For example, since an accession number "0001" has been issued for the job information registered in the row 211, "0001" is registered in the field 204 of the row 211.

A field 205 is a field for registering a user name of the user corresponding to the job. For example, the job information registered in the row 211 is the job information of a job that a user (non-administrator general user) whose user name is "ippan" has caused the job processing apparatus 100 to execute after logging in the job processing apparatus 100. Additionally, for example, the job information registered in the row 214 is the job information of a job that a user whose user name is "root" (administrator) has caused the job processing apparatus 100 to execute after logging in the job processing apparatus 100.

In FIG. 2, as indicated by reference numeral 202, respective pieces of job information (pieces of job information registered in rows 211 to 217) of seven jobs are registered in the history table 200. Note that although a table for managing job information concerning an email transmission job has been explained, the following description can be similarly applied to a table for managing job information of other types of jobs and a table having a mix of pieces of job information of these other types of jobs.

Next, a GUI for setting the function (My job history function) of displaying only job information corresponding to a user currently logged in to the job processing apparatus 100 as valid or invalid will be described with reference to FIG. 3.

Figure 3:
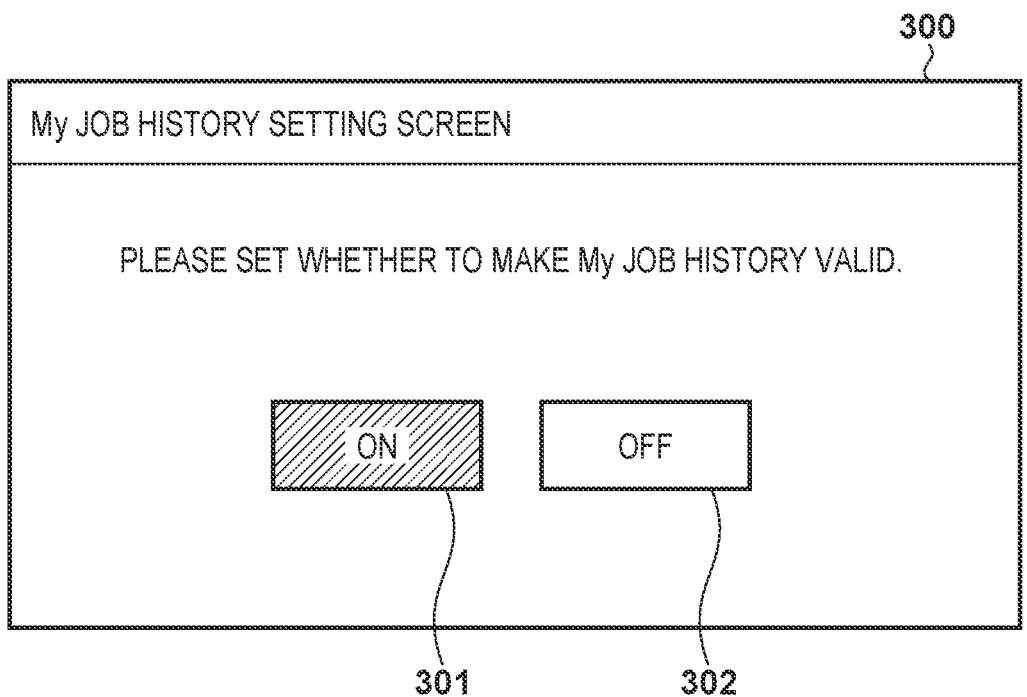
FIG. 3 is a view for explaining a GUI 300.

When the user operates the operation unit 104 and inputs an instruction to activate the "GUI for setting the My job history function as valid or invalid", the CPU 101 displays a GUI 300, shown in FIG. 3, on the touch panel screen included in the operation unit 104. When the user touches a button 301, the My job history function becomes valid. When the user touches a button 302, the My job history function become invalid. The CPU 101 switches the valid/invalid setting of the My job history function.

A case where a general user logs in to the job processing apparatus 100 when the My job history function is in a valid state and causes to print the job information of a job that the user had caused the job processing apparatus 100 to execute in the past will be explained.

When the general user or another user operates the operation unit 104 and inputs an instruction to display the list of the pieces of job information in a state in which the general user is logged in to the job processing apparatus 100 in a state that the My job history function is valid, the CPU 101 displays a GUI 400, shown in FIG. 4A, on the touch panel screen included in the operation unit 104. The GUI 400 displays a list of the pieces of job information (that is, the pieces of job information registered in the rows 211 to 213 and 217) of jobs corresponding to the general user extracted from the history table 200 in FIG. 2. As shown in a field 402, pieces of job information corresponding to the user name "ippan" are listed and displayed in the GUI 400.

Reference numeral 401 in the GUI 400 is a character string indicating that the logged-in user is a general user and is strictly a character string that can uniquely identify the logged-in user such as the user ID of the logged-in user.

If the user touches a button 403, the CPU 101 causes the printing unit 107 to print the pieces of job information displayed in the rows 211 to 213 and 217. A result (communication management report) 410 obtained by causing the printing unit 107 to print the pieces of job information respectively displayed on the rows 211 to 213 and 217 is shown in FIG. 4B.

Assume that when the respective pieces of job information of the rows 211 to 213 and 217 are printed, the checkmarks are respectively registered to the fields 203 of the rows 211 to 213 and 217 as shown in FIG. 4C. The job processing apparatus 100 has the above-described "automatic communication management report function", that is, a "function for printing the predetermined number of pieces of unprinted job information when the number of pieces of unprinted job information reaches a predetermined number". When the job processing apparatus 100 executes this function, the job processing apparatus 100 counts the number of pieces of job information for which the checkmark is not registered in the field 203 and prints the pieces of job information for which the checkmark is not registered in the field 203 when the counted number reaches the predetermined number. However, in a case like FIG. 4C, because the checkmarks are registered in the fields 203 for all the pieces of the job information registered in the rows 211 to 213 and 217, these are excluded from printing targets of the "automatic communication management report function". That is, the job information printed by the user by operating the GUI 400 in FIG. 4A is not a printing target for the "automatic communication management report function". Even if obtaining an automatic communication management report having an omitted job history, the administrator cannot manage all the job histories, and this will impede the business operations.

On the other hand, when the administrator or another user operates the operation unit 104 and inputs an instruction to display the list of pieces of job information in a state where the administrator is logged in to the job processing apparatus 100 in a state that a My job history function is valid, the CPU 101 displays a GUI 500, shown in FIG. 5A, on the touch panel screen included in the operation unit 104. The GUI 500 displays the list of the pieces of job information (that is, pieces of job information respectively registered to the rows 211 to 217) of the respective jobs registered in the history table 200 in FIG. 2. In other words, the GUI 500 displays, as indicated in fields 505, a list including job information having "root" as its user name and job information having "ippan" as its user name.

Reference numeral 501 in the GUI 500 is a character string indicating that the logged-in user is the administrator and is strictly a character string that can uniquely identify the logged-in user such as the user ID of the logged-in user.

If the user touches a button 502 and makes the button 502 valid, instead of all the pieces of job information of the rows 211 to 217, the pieces of job information of the rows 214 to 216, that is, pieces of job information of jobs that the administrator caused the job processing apparatus 100 to execute can be displayed. Additionally, if the user touches the button 502 again and makes the button 502 invalid, instead of the pieces of job information of the rows 214 to 216, all the pieces of job information of the rows 211 to 217, that is, the pieces of job information of jobs that the administrator has caused the job processing apparatus 100 to execute and the pieces of job information of jobs that a non-administrator has caused the job processing apparatus 100 to execute can be displayed.

If the user touches a button 503, pieces of job information displayed as a list on the GUI 500 at that time become printing targets, and the printing unit 107 is caused to print the pieces of job information that are the printing targets.

Assume that when the pieces of job information of the rows 214 to 216 are printed, checkmarks are registered in the fields 203 of the respective rows 214 to 216, as shown in FIG. 5B. In a case like FIG. 5B, because the checkmarks are registered in the fields 203, all the pieces of the job information registered in the rows 214 to 216 are excluded from printing targets of the "automatic communication management report function". In other words, the job information which is printed by operating the GUI 500 of FIG. 5A by the user is excluded from printing targets of the "automatic communication management report function". Even if obtaining an automatic communication management report having an omitted job history, the administrator cannot manage all the job histories, and this will impede the business operations.

In this embodiment, therefore, in order to prevent the job information that has been printed by the user by operating the GUI 400 of FIG. 4A or the GUI 500 of FIG. 5A from being excluded from printing targets of the "automatic communication management report function", no checkmark is controlled to be registered to the field 203 corresponding to job information even if the job information has been printed.

Figure 6:
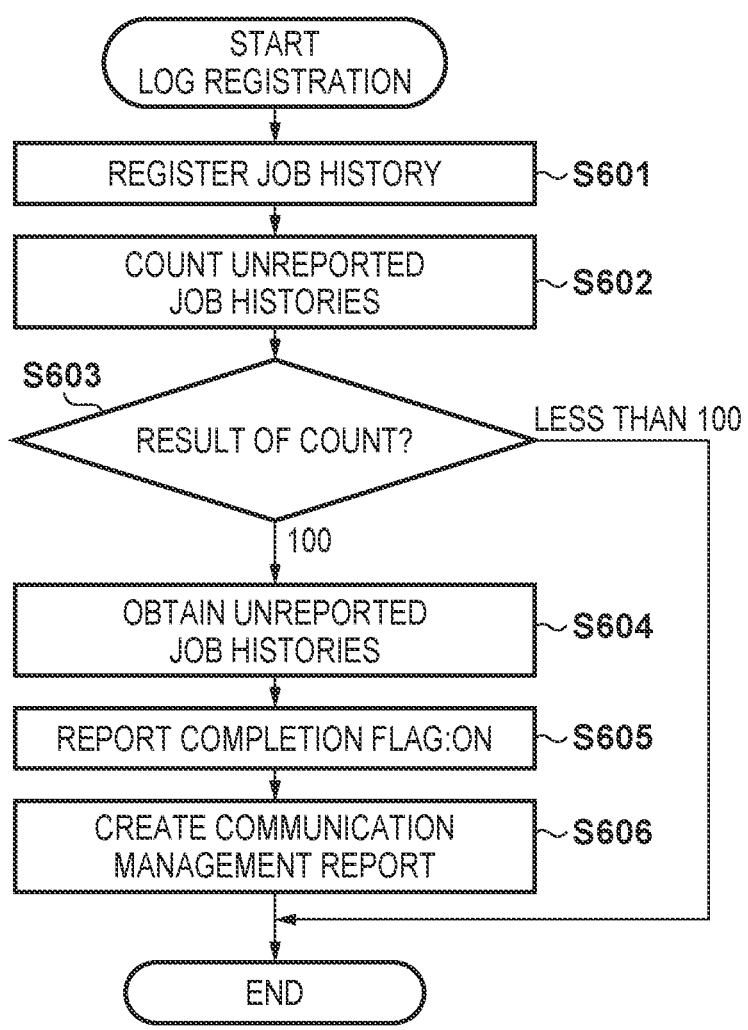
FIG. 6 is a flowchart showing printing processing performed using an "automatic communication management report function"

Printing processing executed by the job processing apparatus 100 by using the "automatic communication management report function" will be explained first with reference to FIG. 6 which shows the flowchart of this processing. The processing according to the flowchart of FIG. 6 is processing performed every time one or a predetermined number of jobs are processed.

<Step S601>

The CPU 101 registers the job information of a processed job in the history table 200 managed in the hard disk 108. For example, job information concerning a transmitted email job, job information concerning a printing job printed by the printing unit 107, or the like is registered in the history table 200.

<Step S602>

The CPU 101 checks the field 203 of each row of the history table 200 and counts the number of rows each with no checkmark registered, that is, the number of pieces of unprinted job information.

<Step S603>

The CPU 101 determines whether the number counted in step S602, that is, the number of pieces of unprinted job information is equal to or more than a predetermined number. For example, assume the predetermined number=100. As a result of this determination, if the number of pieces of unprinted job information is 100 or more, the process advances to step S604. If the number of pieces of unprinted job information is less than 100, the process according to the flowchart of FIG. 6 is completed.

<Step S604>

The CPU 101 extracts, from the history table 200, pieces of job information each with no checkmark registered in the field 203.

\<Step S605\>

The CPU 101 registers a checkmark to the field 203 corresponding to each piece of job information that was extracted from the history table 200 in step S604. This allows the job information managed as unprinted job information to be managed as printed job information.

\<Step S606\>

The CPU 101 transmits the pieces of job information extracted from the history table 200 in step S604 to the printing unit 107 and causes the printing unit 107 to print the extracted pieces of job information.

Job information printing processing executed by the job processing apparatus 100 when the button 403 or the button 503 is touched by the user will be explained next with reference to FIG. 7 which shows the flowchart of this processing.

\<Step S701\>

The CPU 101 checks whether the ID of the user who is currently logged in to the job processing apparatus 100 is the ID of the administrator or an ID of a non-administrator. For example, the CPU 101 checks whether the user ID input by the user to log in to the job processing apparatus 100 is the user ID of the administrator or the user ID of a non-administrator. As a result of this check, if the ID of the user currently logged in to the job processing apparatus 100 is the ID of the administrator, the process advances to step S702. If it is the ID of a non-administrator, the process advances to step S703.

\<Step S702\>

The CPU 101 determines whether the button 502 is in a valid state or an invalid state. As a result of this determination, if the button 502 is in a valid state, the process advances to step S703. If the button 502 is in an invalid state, the process advances to step S704.

\<Step S703\>

The CPU 101 extracts, from the history table 200, job information corresponding to the logged-in user (job information including the user name of the user who logged in). Note that if the process advances from step S701 to step S703, "job information corresponding to the logged-in user" is job information which includes the user name of the non-administrator. If the process advances from step S702 to step S703, "job information corresponding to the logged-in user" is job information which includes the user name of the administrator.

\<Step S704\>

The CPU 101 extracts, from the history table 200, the pieces of job information registered in the history table 200, that is, the respective pieces of job information of the administrator and the non-administrator.

\<Step S705\>

The CPU 101 determines whether the My job history function is valid. As a result of this determination, if the My job history function is valid, the process advances to step S707. If the My job history function is invalid, the process advances to step S706.

\<Step S706\>

The CPU 101 registers a checkmark to the field 203 corresponding to each piece of job information that was extracted from the history table 200 in step S704. The process then advances to step S707.

\<Step S707\>

The CPU 101 transmits, to the printing unit 107, the pieces of job information extracted from the history table 200 in step S703 or step S704 and causes the printing unit 107 to print the extracted pieces of job information.

How the job information that has been printed by the user by operating the GUI 400 of FIG. 4A or the GUI 500 of FIG. 5A becomes not excluded from a printing target of the "automatic communication management report function" due to the processing according to the flowchart of FIG. 7 will be explained next.

As described with reference to FIGS. 4A to 4C, if the respective pieces of job information in the rows 211 to 213 and 217 are printed and checkmarks are registered in fields 203 of the rows 211 to 213 and 217 as shown in FIG. 4C, any piece of job information registered in the rows 211 to 213 and 217 is excluded from printing targets of the "automatic communication management report function". This is due to processing based on a rule which makes the report completion flag of a job history to always change to "printed" if the job history was handled in the communication management report. This is the same for the cases in FIGS. 5A and 5B.

Figure 7:
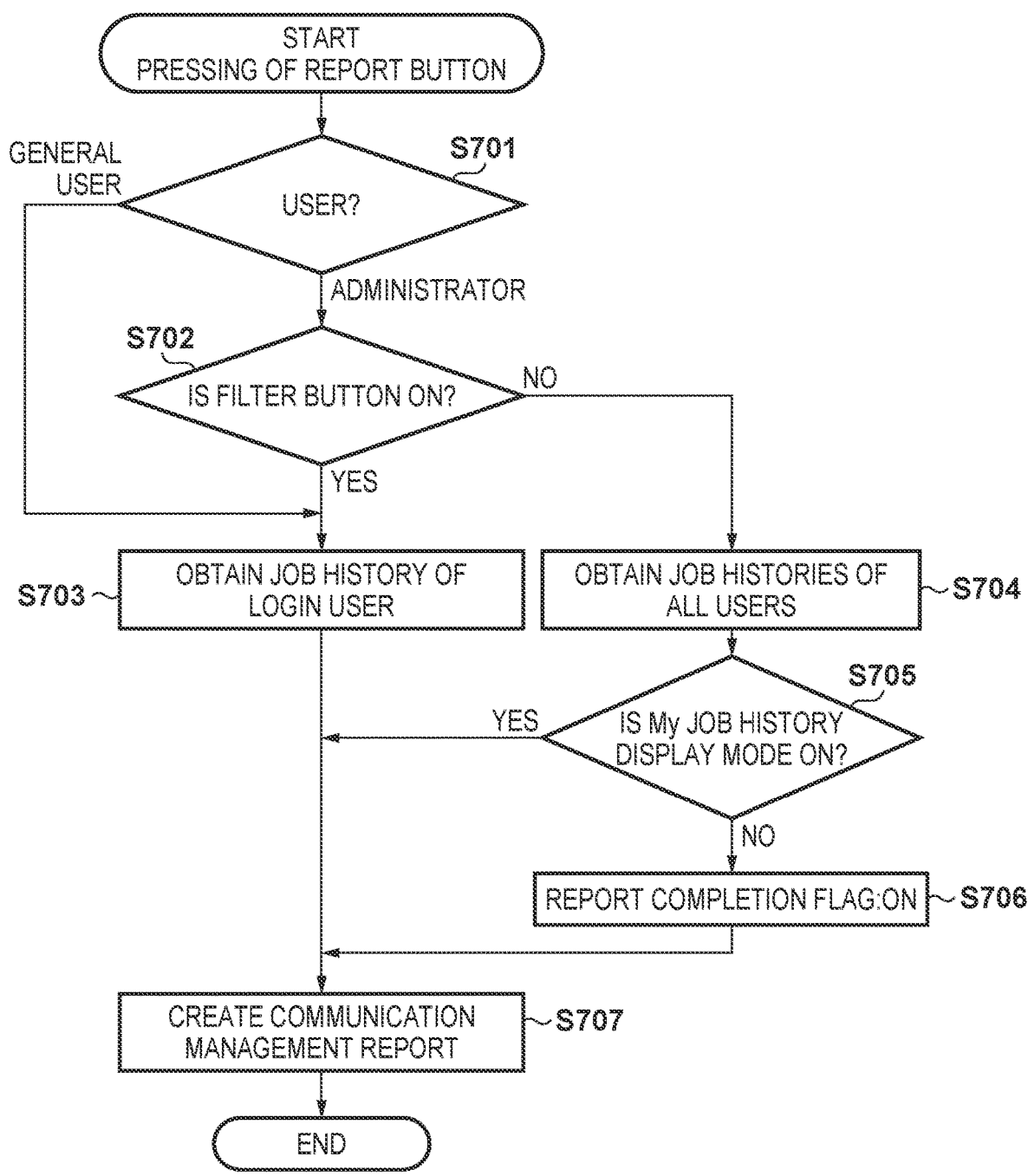
FIG. 7 is a flowchart showing printing processing performed when a button 403 or a button 503 is touched.

However, if the processing according to the flowchart of FIG. 7 is executed to print the pieces of job information of the rows 211 to 213 and 217, the process advances in the order of step S701→step S703→step S707. Since each corresponding field 203 is not updated in any way even if the respective pieces of job information in the rows 211 to 213 and 217 are printed, checkmarks are not registered (not handled as printed job information) to fields 203 of the rows 211 to 213 and 217, as a matter of course. Hence, since the respective pieces of job information in the rows 211 to 213 and 217 become targets for counting the "number of pieces of job information each with no checkmark registered in the field 203" at the time of executing the "automatic communication management report function", all pieces of job information registered in the rows 211 to 213 and 217 become the printing targets of the "automatic communication management report function". Therefore, the administrator can obtain an automatic communication management report without any omitted job history and manage all of the job histories.

Additionally, if attention is paid to the handling of the field 203 in the processing according to the flowchart of FIG. 6, a checkmark is always registered in step S605 for each field 203 of a row corresponding to printed job information. Therefore, job information that has been printed once is excluded from targets in the next printing operation by the "automatic communication management report function" and the job history is not redundantly managed.

Further, if the processing according to the flowchart of FIG. 7 is executed to print the pieces of job information of the rows 214 to 216, the process advances in the order of step S701→step S702→step S703→step S707. Since each corresponding field 203 is not updated in any way even if the respective pieces of job information in the rows 214 to 216 are printed, checkmarks are not registered (not handled as a piece of printed job information) to fields 203 of the rows 214 to 216, as a matter of course. Hence, since the respective pieces of job information in the rows 214 to 216 become targets for counting the "number of pieces of job information each with no checkmark registered in the field 203" at the time of executing the "automatic communication management report function", any piece of job information registered in the rows 214 to 216 becomes the printing target of the "automatic communication management report function". Therefore, the administrator can obtain an automatic communication management report without any omitted job history and manage all of the job histories.

Second Embodiment

In the first embodiment, the field 203 is provided in the history table 200. Job information corresponding to a row with a checkmark registered in the field 203 is managed as "printed job information", and job information corresponding to a row with no checkmark registered in the field 203 is managed as "unprinted job information". However, the method of managing whether each job information is printed job information or unprinted job information is not limited to such a method. For example, whether each job information is unprinted job information or printed job information can be identified by a method that assigns a value "0" to the job information managed as unprinted job information and a value "1" to the job information managed as printed job information. Furthermore, unprinted job information and printed job information may be managed separately.

Also, in the first embodiment, as shown in FIG. 1, the job processing apparatus has been described as comprising an arrangement for performing printing, that is, the printing unit 107. However, a printing unit 107 can be provided externally to the job processing apparatus. In this case, the job processing apparatus may transmit job information determined to be a printing target to the external printing unit 107.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-231968, filed Nov. 14, 2014 which is hereby incorporated by reference herein in its entirety.

What is claimed is:

1. A job processing apparatus that processes a job, comprising:
    a storage that stores history information including job histories of processed jobs;
    a processor that executes instructions causing the job processing apparatus to:
    display a job history screen using the stored history information and a first object that accepts an instruction to change content about one or more job histories to be displayed on the job history screen;
    display, as the content on the job history screen, a list about first history information in which both the one or more job histories of a user that is logged in to the job processing apparatus and the one or more job histories of a user different from the logged-in user are displayed; and
    display, as the content on the job history screen according to an instruction accepted by the first object, a list about second history information in which the one or more job histories of the logged-in user are displayed without displaying the one or more job histories of the user different from the logged-in user,
    wherein, when the job history screen is displayed, a second object that accepts an instruction for printing one or more job histories included in the stored history information is displayed in addition to the first object.

2. The job processing apparatus according to claim 1, wherein the instructions executed by the processor further cause the job processing apparatus to print, according to an instruction accepted by the second object, one or more job histories currently displayed on the job history screen.

3. The job processing apparatus according to claim 1, further comprising a scanner,
    wherein a job history of a job for transmitting, to a network, image data that has been generated based on a readout by the scanner is included on the displayed job history screen.

4. The job processing apparatus according to claim 1, wherein information for identifying the logged-in user is included on the displayed job history screen.

5. The job processing apparatus according to claim 1, wherein the stored history information includes identification information of a user who designated execution of a job and an execution result of the job.

6. The job processing apparatus according to claim 1, wherein both the first object and the second object are displayed when the job history screen for a logged-in user who has been logged in as an administrator is displayed.

7. The job processing apparatus according to claim 1, wherein the instructions executed by the processor further cause the job processing apparatus to display a third object related to detailed information of the history information in addition to the first object and the second object.

8. The job processing apparatus according to claim 1, wherein the instructions executed by the processor further cause the job processing apparatus to change the content on the job history screen to the list about the first history information on the job history screen, in a case where another instruction from the logged-in user is received when the list about the second history information is displayed as the content on the job history screen.

9. A control method for a job processing apparatus, comprising:
    storing history information including job histories of processed jobs;
    displaying a job history screen using the stored history information and a first object that accepts an instruction to change content about one or more histories to be displayed on the job history screen;
    displaying, as the content on the job history screen, a list about first history information in which both the one or more job histories of a user that is logged in to the job processing apparatus and the one or more job histories of a user different from the logged-in user are displayed; and displaying, as the content on the job history screen according to an instruction accepted by the first object, a list about second history information in which the one or more job histories of the logged-in user are displayed without displaying the one or more job histories of the user different from the logged-in user, wherein, when the job history screen is displayed, a second object that accepts an instruction for printing one or more job histories included in the stored history information is displayed in addition to the first object.

10. A non-transitory computer-readable storage medium storing a computer program for causing a computer to execute a control method for a job processing apparatus, the method comprising:

storing history information including job histories of processed jobs; displaying a job history screen using the stored history information and a first object that accepts an instruction to change content about one or more job histories to be displayed on the job history screen;

displaying, as the content on the job history screen, a list about first history information in which both the one or more job histories of a user that is logged in to the job processing apparatus and the one or more job histories of a user different from the logged-in user are displayed; and displaying, as the content on the job history screen according to an instruction accepted by the first object, a list about second history information in which the one or more job histories of the logged-in user are displayed without displaying the one or more job histories of the user different from the logged-in user, wherein, when the job history screen is displayed, a second object that accepts an instruction for printing one or more job histories included in the stored history information is displayed in addition to the first object.

* * * * *